US008311780B2

(12) United States Patent
Krupansky et al.

(10) Patent No.: US 8,311,780 B2
(45) Date of Patent: Nov. 13, 2012

(54) ENHANCED PREDICTION OF ATMOSPHERIC PARAMETERS

(75) Inventors: Petr Krupansky, Veverska Bityska (CZ); Tomas Neuzil, Brno (CZ); Eva Gelnarova, Brno (CZ); Martin Herodes, Brezolupy (CZ); Jiri Svoboda, Okr. Novy Jicin (CZ)

(73) Assignee: Honeywell International Inc., Morristown, NJ (US)

( * ) Notice: Subject to any disclaimer, the term of this patent is extended or adjusted under 35 U.S.C. 154(b) by 736 days.

(21) Appl. No.: 12/429,025

(22) Filed: Apr. 23, 2009

(65) Prior Publication Data

US 2010/0274542 A1 Oct. 28, 2010

(51) Int. Cl.
*G06F 7/60* (2006.01)
*G06F 17/10* (2006.01)
(52) U.S. Cl. ........................................................... 703/2
(58) Field of Classification Search .................... 703/2, 6
See application file for complete search history.

(56) References Cited

U.S. PATENT DOCUMENTS

| | | | |
|---|---|---|---|
| 6,184,816 B1 * | 2/2001 | Zheng et al. ................ 342/26 R |
| 6,507,782 B1 | 1/2003 | Rumbo et al. | |
| 6,707,415 B1 | 3/2004 | Christianson | |
| 6,720,906 B2 | 4/2004 | Szeto et al. | |
| 6,963,291 B2 * | 11/2005 | Holforty et al. ............. 340/945 |
| 7,016,825 B1 * | 3/2006 | Tryon, III .......................... 703/6 |
| 7,132,982 B2 * | 11/2006 | Smith et al. .................... 342/456 |
| 7,249,007 B1 * | 7/2007 | Dutton ............................. 703/2 |
| 7,411,519 B1 * | 8/2008 | Kuntman et al. ............. 340/968 |
| 7,492,305 B1 | 2/2009 | Woodell et al. | |
| 2006/0155432 A1 * | 7/2006 | Brown ............................ 701/14 |
| 2008/0165051 A1 | 7/2008 | Khatwa | |
| 2010/0271239 A1 * | 10/2010 | Kolcarek et al. ............. 340/971 |
| 2011/0178756 A1 * | 7/2011 | Anderson ..................... 702/104 |

* cited by examiner

*Primary Examiner* — Mary C Jacob
*Assistant Examiner* — Aniss Chad
(74) *Attorney, Agent, or Firm* — Ingrassia Fisher & Lorenz P.C.

(57) ABSTRACT

A method and software program for providing a weather prediction of atmospheric parameters for an aircraft, includes collecting (202) at least one of a statistical description of the weather forecast or the historical weather data, processing (210) current atmospheric data received from sensors on-board the aircraft, forming (230) modeled data based on the processed current atmospheric data and the at least one of a statistical description of the weather forecast or the historical weather data, blending (250) the modeled data with the at least one of a statistical description of the weather forecast or the historical weather data, and predicting (270) atmospheric parameters based on the blending step.

15 Claims, 3 Drawing Sheets

ENHANCED PREDICTION OF ATMOSPHERIC PARAMETERS

FIELD OF THE INVENTION

The present invention generally relates to presenting weather conditions to an aircraft, and more particularly to methods for enhancing prediction of weather data.

BACKGROUND OF THE INVENTION

It is essential for pilots to have accurate data relating to atmospheric values, for example, winds, at the current location and on the intended route of the aircraft. Such data is important for the safety of the aircraft, optimization of flight economy, as well as for ensuring the required time of arrival is satisfied.

Aircraft typically have sensors on-board that provide data relating to many atmospheric data, including wind, temperature, humidity, and atmospheric pressure. Additionally, atmospheric data on the intended route may be provided from ground based systems and other aircraft. However, this data collected on-board and from other sources lacks accuracy in that the weather changes as the aircraft progresses along its route.

Accordingly, it is desirable to provide a method, system, and computer program for improving the reliability of an onboard aircraft weather prediction algorithm. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method and software program for providing a weather prediction of atmospheric parameters for an aircraft, includes collecting at least one of a statistical description of the weather forecast or the historical weather data, processing current atmospheric data received from sensors on-board the aircraft, forming modeled data based on the processed current atmospheric data and the at least one of a statistical description of the weather forecast or the historical weather data, blending the modeled data with the at least one of a statistical description of the weather forecast or the historical weather data, and predicting the weather along the planned trajectory based on the blending step.

In a second embodiment, a method of providing a weather prediction of atmospheric parameters for an aircraft includes measuring atmospheric data with sensors on the aircraft; sampling the atmospheric data; determining a statistical description of the measured atmospheric data; collecting a statistical description, including the precision of estimates, for example a standard deviation, of the historical trends of previously recorded atmospheric data; forming a model formulated on the determined statistical description, including interpolating the historical trends, assessing model parameters based on the sampled atmospheric data and the statistical description of the historical trends, estimating mean values of the model parameters, and estimating an accuracy of the model parameters; assessing the model parameters from the mean values, the precision of estimates, for example the standard deviation, and the statistical description of the historical trends; and blending the assessed models parameters based on the statistical description of the historical trends.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Complex analysis of weather data has demonstrated some predictable trends in weather behavior, especially at higher altitudes. As described herein, the exemplary embodiments describe a system, method, and a prediction algorithm which is able to statistically assess current and past weather data and extrapolate the data in a prediction horizon. The algorithm includes weighted blending with inserted/uploaded up-to-date forecast data or prepared typical trends based upon statistical analysis of historical data. The method includes the ability to prepare suitable trends.

Figure 1:
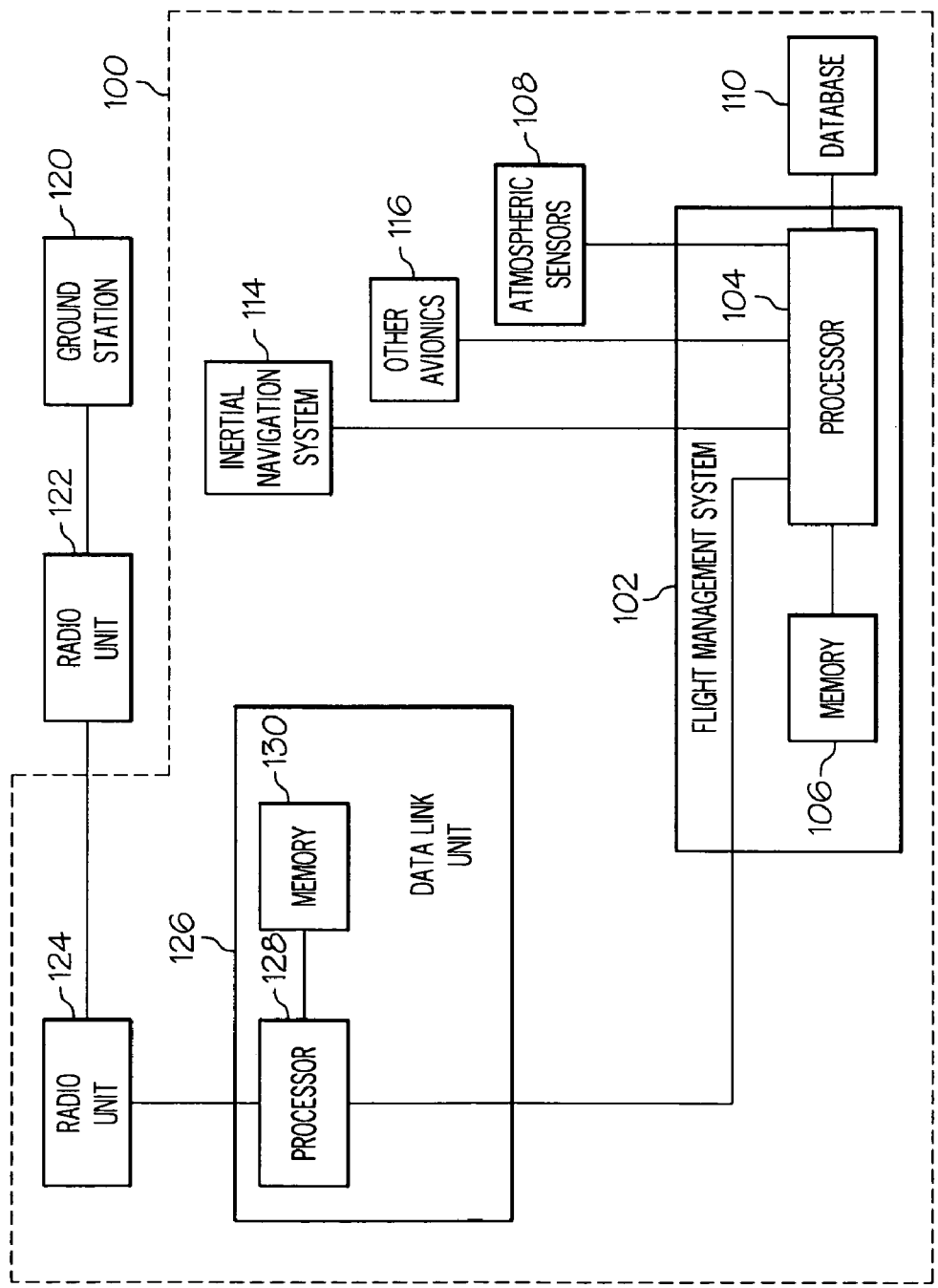
FIG. 1 is a block diagram of a system that performs the exemplary embodiments of the present invention.

Referring to FIG. 1, an exemplary system 100 includes a flight management system 102 for computing a weather prediction based on available weather forecast data and a statistical description thereof, aircraft performance, and the planned route. The exemplary system 100 also includes atmospheric sensors 108 for sensing the current weather situation, e.g., a weather map of temperature and wind speed and direction, and a database 110 (for storing past measured weather situations, forecasted weather data, historical weather data and/or their statistical description). The flight management system 102 is coupled to an inertial navigation system 114 for determining the state of the aircraft, e.g., position and speed, and other avionics 116 for determining, e.g., aircraft performance such as engine performance and settings. The flight management system, in addition to sensing the current weather by atmospheric sensors 108, also considers either historical weather data or forecasted weather data (and their statistical description) that may be stored in the database 110, but preferably is provided by a ground station 120. Weather data from the ground station 120 may be provided by a ground based radio unit 122 to an on-board radio unit 124 within the exemplary system 100. An on-board data link unit 126 receives and controls data link communication and includes a processor 128 and memory 130. The weather data is transferred from the processor 128 to the processor 104 and memory 106.

Figure 2:
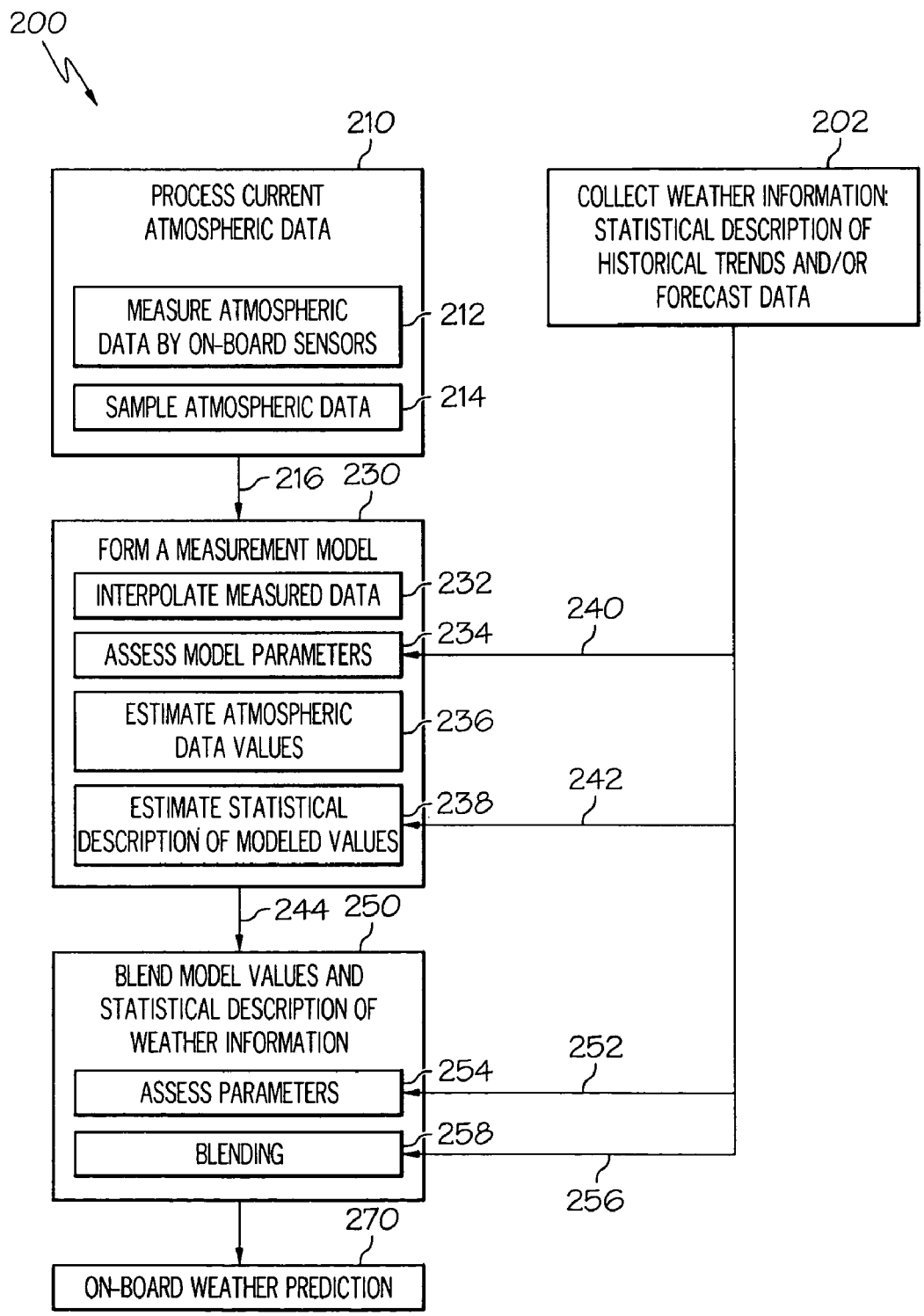
FIG. 2 is a flow chart illustrating a method of one exemplary embodiment.

Referring to the flow chart of FIG. 2, the method 200 includes the step of collecting 202 weather information from a database (either ground or airborne based) including at least one of historical trends or forecasted weather data. This collected weather information pertains to the intended route of flight and considers temporal factors, such as the season, time of day, and so forth. The position of the database is not limited and may be terrain based, for example, the rapid update cycle (RUC) database provided in the continental United States.

The collected weather information includes a statistical description such as mean values, standard deviation, and the like.

Current atmospheric parameters measured on-board are processed 210, and a measurement model is created 230 from the collected weather information and processed current atmospheric parameters. A blending 250 of the measurement model predicted values and the statistical description of the weather information provides an on-board weather prediction.

In one exemplary embodiment, the processing 210 of the current atmospheric parameters includes a measurement 212 of atmospheric data by on-board sensors. The atmospheric data preferably includes a sampling 214 of wind magnitude and bearing, but may also include, for example, a sampling of humidity and temperature. An assessed statistical description, e.g., standard deviation, of the measured current atmospheric data is provided 216 to the measurement model. This processing 210 of current atmospheric data provides a description of the magnitude and bearing dynamics and a setting of the measurement model parameters.

The creation 230 of the exemplary measurement model includes an interpolation 232 of measured data, an assessment 234 of measurement model parameters (extrapolation), an estimation 236 of mean values of the atmospheric data values, e.g., magnitude and bearing values, by extrapolation, and an estimation 238 of a statistical description of modeled values, e.g., standard deviation values. The statistical description of the collected weather information (wind magnitude and bearing behavior) is provided 240, 242 for the measurement model parameter assessment 234 and for the estimation of the standard deviation values 238.

An estimation of the mean values of the wind magnitude and bearing and their standard deviation is provided 244 for the blending step 250. A statistical description of the predictability of magnitude and bearing behavior at the waypoints of the aircraft trajectory based on current aircraft position is provided 252 for assessing 254 the blending parameters. And a statistic description of the weather behavior at the waypoints of the aircraft trajectory are provided 256 for a blending 258, with the result being an on-board prediction 270 of the wind magnitude and bearing for the remainder of the flight. These steps are continually repeated to provide an updated on-board prediction as the flight progresses.

Figure 3:
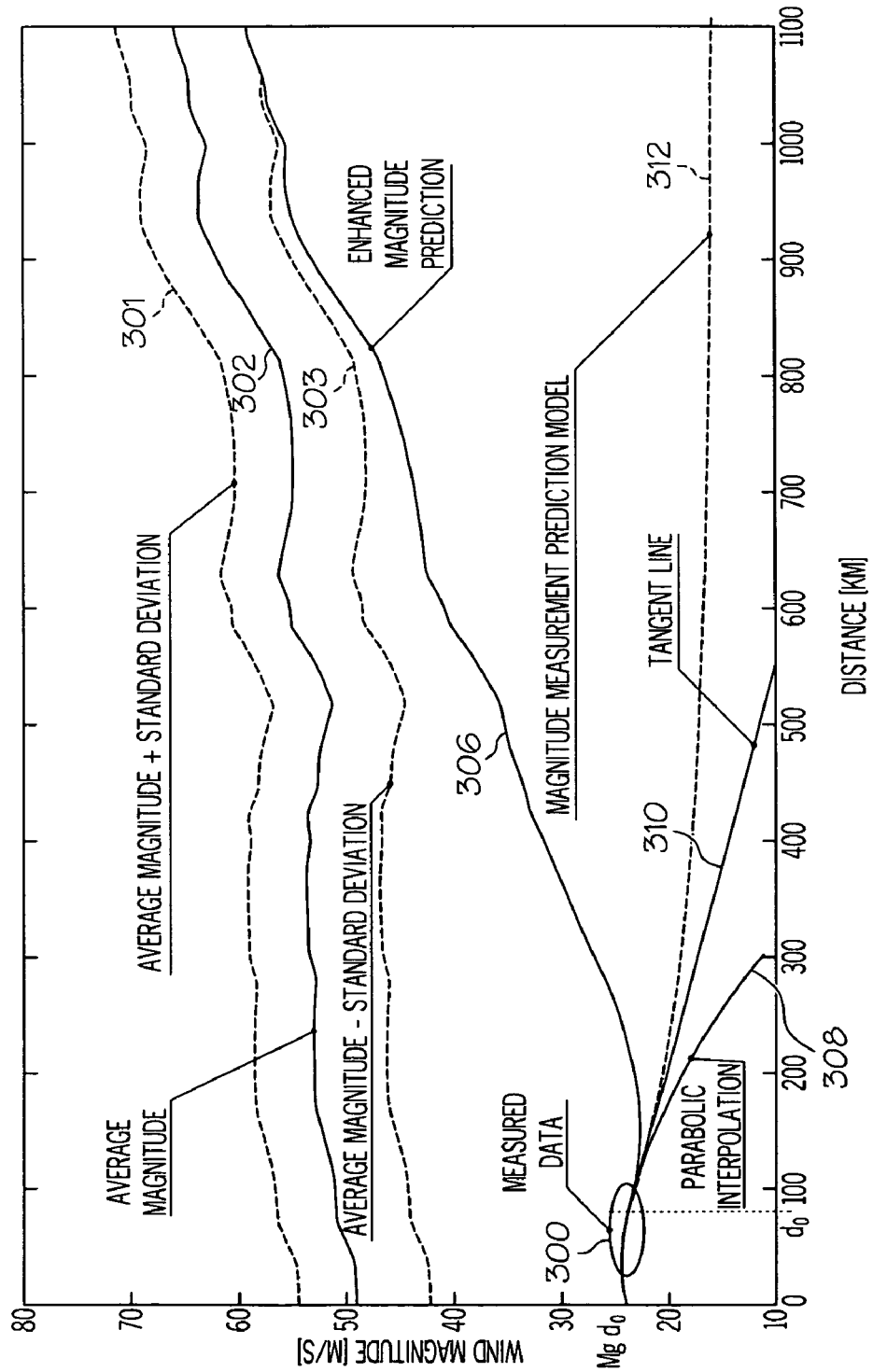
FIG. 3 is a graph of the wind magnitude verses distance determined in accordance with the exemplary embodiment.

A discussion of the exemplary method 200 (algorithm) follows. In FIG. 3, the current wind magnitude samples measured with on-board sensors are marked by the ellipse "Measured Data" 300. The average values of the wind magnitude from database or meteorological forecast are represented by the curve "Average Magnitude" 302, and its standard deviation is represented by the line "Average Magnitude+Standard Deviation" 301 and line "Average Magnitude−Standard Deviation" 303. The onboard predicted wind magnitude is represented by the line "Enhanced Magnitude Prediction" 306. Referring to both FIGS. 2 and 3, the parabolic interpolation of past data of step 232 is calculated by the formula $Mg=ad^2+bd+c$ and is represented by the curve "Parabolic Interpolation" 308. The curve parameters a, b, c are estimated by the least squares method, wherein the d parameter is the distance from the point of measurement.

The line "Tangent Line" 310 in the last point of measurement is computed by the formula $k_{tg}=2ad_0+b$ and serves the purpose of determining the measurement prediction model parameters. The measurement prediction is represented by the curve "Magnitude Measurement Prediction Model" 312. The predicted values are computed by equation $Mg_{Meas}=K_E[1-e^{-d/D}]$. The parameters of the measurement model, the $K_E$ (saturation) and D (rise distance), are computed also with help of characteristics estimated from database or meteorological forecast.

The second part of the measurement prediction model is defined by the formula $\sigma_{meas(d)}=(\sigma_{trend\_average}/\text{Credibility-Horizon})*\text{distance}$. It determines the value of the standard deviation of the measurement model. The credibility horizon value is either set to predetermine level e.g., 200 km, or it is set with the help of the statistical processing of the historical weather trend (step 252). The values from the measurement model and statistical processed values from database or meteorological forecast are blended to get the resulting onboard enhanced weather prediction represented by the curve "Enhanced Magnitude Prediction" 306. The resulting onboard enhanced weather prediction is computed by the equation $Mg_F=\sigma^2_{Meas}*Mg_{Trend}/(\sigma^2_{Meas}+\sigma^2_{Trend})+\sigma^2_{Trend}*Mg_{Meas}/(\sigma^2_{Meas}+\sigma^2_{Trend})$.

It may be seen from the preceding discussion that a method has been described that provides an enhanced prediction of atmospheric parameters by forming a measurement model from current atmospheric data and a statistical description from one of historical trends or forecasted data and blending estimated mean values of wind magnitude and bearing, and a standard deviation thereof, with the statistical description of values of interest.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method of providing a prediction of atmospheric parameters for an aircraft, comprising:
    collecting a statistical description of at least one of a weather forecast or historical weather data;
    processing current atmospheric data received from sensors on-board the aircraft;
    forming modeled data based on the processed current atmospheric data and the statistical description of at least one of the weather forecast and the historical weather data;
    defining a weighted blending and weighted parameters between modeled data of the current atmospheric data and at least one of the weather forecast and the historical weather data, and an estimation of mean values and a standard deviation of atmospheric data;
    blending the standard deviation of the modeled data with the at least one of a statistical description of the weather forecast or the historical weather data to provide weighted blended data, wherein the standard deviation of the modeled data is calculated by the formula $(\sigma_{trend\_average}/\text{Credibility Horizon})*\text{distance}$, where $\sigma_{trend\_average}$ equals the average standard deviation of the weather forecast or the historical weather data, and Credibility Horizon is a predetermined distance; and
    predicting atmospheric parameters along planned trajectory based on the weighted blended data.

2. The method of claim 1 wherein the defining step includes a statistical description of the predictability of atmosphere behavior on the aircraft trajectory.

3. The method of claim 1 wherein the processing step includes an estimation of mean values and standard deviation of atmospheric data.

4. The method of claim 1 wherein the collecting step includes calculating a interpolation of past data.

5. The method of claim 4 wherein the interpolation equals quadratic equation $ad^2+bd+c$, where a, b, c are estimated by the least squares method, wherein the root of the quadratic equation d is the distance from a point of measurement, a and b are unknown variables, and c is a constant.

6. A method of providing a prediction of atmospheric parameters for an aircraft, comprising:
measuring atmospheric data with sensors on the aircraft;
sampling the atmospheric data;
determining a statistical description of the measured atmospheric data;
collecting a statistical description, including a standard deviation, of historical trends of previously recorded atmospheric data;
forming a measurement model formulated on the determined statistical description, comprising:
interpolating the historical trends;
assessing measurement model parameters based on the sampled atmospheric data and the statistical description of the historical trends;
estimating atmospheric values from the measurement model; and
estimating a statistical description of atmospheric values from the measurement model;
defining a weighting blending and blending parameters between modeled data of the atmospheric data from the measurement model and one of a weather forecast and the historical weather data, and an estimation of mean values and standard deviation of atmospheric data; and
blending the estimated values from atmospheric measurement model with the statistical description of the historical trends to provide weighted blended data which provides a prediction of atmospheric parameters along planned trajectory based on the weighted blended data by the formula $\sigma^2_{Meas}*Mg_{Trend}/(\sigma^2_{Meas}+\sigma^2_{Trend})+\sigma^2_{Trend}*Mg_{Meas}/(\sigma^2_{Meas}+\sigma^2_{Trend})$, where Mg=interpolation, $\sigma^2_{Meas}$ is the square of a standard deviation of the atmospheric measurement model, and $\sigma^2_{Trend}$ is the square of standard deviation of the atmospheric values.

7. The method of claim 6 wherein the defining step includes a statistical description of the predictability of atmosphere behavior on the aircraft trajectory.

8. The method of claim 6 wherein the processing step includes an estimation of mean values and standard deviation of atmospheric data.

9. The method of claim 6 wherein the collecting step includes calculating an interpolation of past data.

10. The method of claim 9 wherein the parabolic interpolation equals the quadratic equation $ad^2+bd+c$, where a, b, c are estimated by the least squares method, wherein the root of the quadratic equation d is the distance from a point of measurement, a and b are unknown variables, and c is a constant.

11. The method of claim 6 wherein the standard deviation is calculated by the formula $(\sigma_{trend\_average}/Credibility Horizon)*distance$, where $\sigma_{trend\_average}$ equals the average standard deviation of trend, and Credibility Horizon is a predetermined distance.

12. A method of providing a prediction of atmospheric parameters for a moving aircraft, comprising:
measuring first atmospheric data with sensors on the aircraft;
sampling the first atmospheric data;
collecting a statistical description, including a standard deviation, of second atmospheric data;
forming a model formulated on the determined statistical description, comprising:
interpolating the second atmospheric data;
assessing model parameters based on the sampled atmospheric data and the statistical description of the second atmospheric data;
estimating atmospheric data values; and
estimating a statistical description of modeled values;
determining a statistical description of a model of the measured first atmospheric data,
wherein the standard deviation of the model of first atmospheric data is calculated by the formula $(\sigma_{trend\_average}/Credibility Horizon)*distance$, where $\sigma_{trend\_average}$ equals the average standard deviation of the second atmospheric trend, and Credibility Horizon is a predetermined distance; and
blending the estimated atmospheric data values with the second atmospheric data to provide weighted blended data.

13. The method of claim 12 wherein the defining step includes computing the interpolation by the formula $\sigma^2_{Meas}*Mg_{Trend}/(\sigma^2_{Meas}+\sigma^2_{Trend})+\sigma^2_{Trend}*Mg_{Meas}/(\sigma^2_{Meas}+\sigma^2_{Trend})$, where Mg=interpolation, $\sigma^2_{Meas}$ is the square of a measured standard deviation, and $\sigma^2_{Trend}$ is the square of a standard deviation of trend.

14. The method of claim 12 wherein the defining step includes a statistical description of the predictability of atmospheric behavior on the aircraft trajectory.

15. The method of claim 12 wherein the collecting step includes calculating a interpolation of past data.

* * * * *